April 5, 1949.    A. W. JACOBSON    2,466,591
AUTOMATIC ELECTRIC MOTOR CONTROL APPARATUS
Filed March 6, 1946
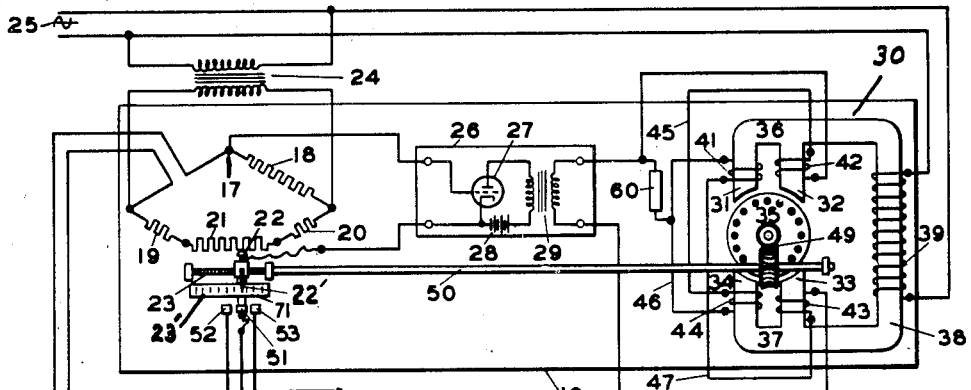
FIG. 1
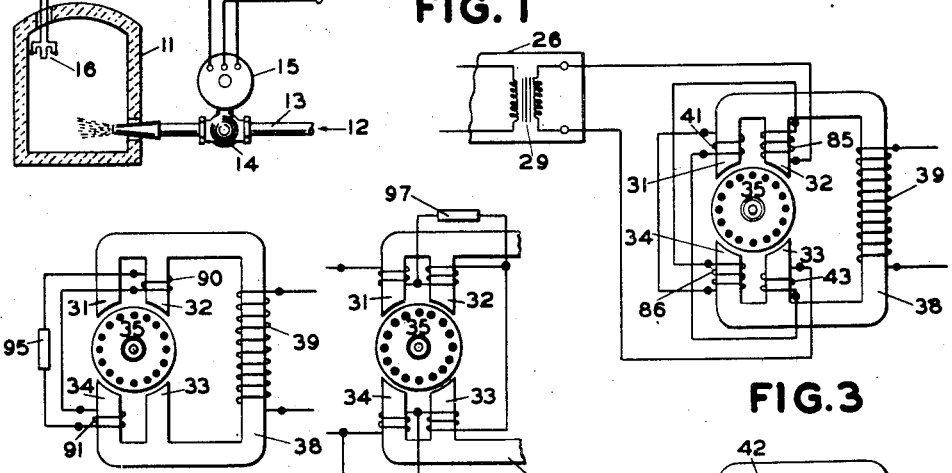
FIG. 3
FIG. 5    FIG. 6
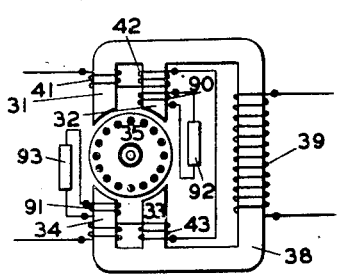
FIG. 4
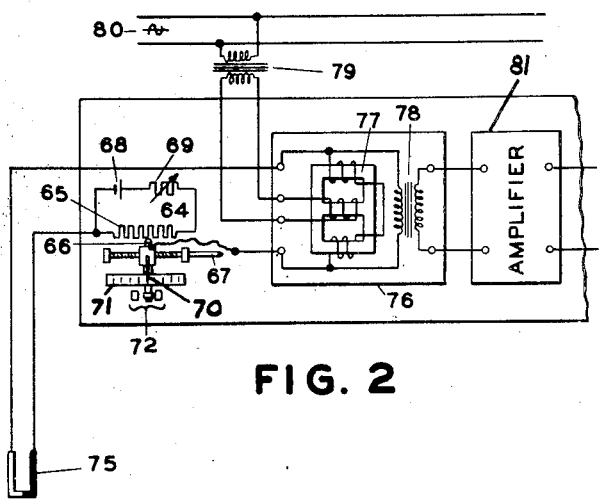
FIG. 2
INVENTOR.
Abraham Walter Jacobson
BY
E. C. Sanborn
Attorney Patented Apr. 5, 1949

2,466,591

UNITED STATES PATENT OFFICE 2,466,591

AUTOMATIC ELECTRIC MOTOR CONTROL APPARATUS

Abraham Walter Jacobson, New Haven, Conn., assignor to The Bristol Company, Waterbury, Conn., a corporation of Connecticut Application March 6, 1946, Serial No. 652,318

22 Claims. (Cl. 318—28)

This invention relates to automatic control devices, and more especially to "fail-safe" means for automatic regulators of temperature and the like, wherein failure of an element of the mechanism or associated electrical circuits might otherwise cause the automatic apparatus to function in a manner to introduce a hazardous condition. The present invention is especially adapted to incorporation into that class of control system wherein an alternating-current electric servomotor actuates a balancing system subject to variations in the measured and regulated magnitude, and said balancing system in turn controls the positioning of a valve or the like whereby is regulated the rate of application of a heating agent or other condition-affecting medium.

In the automatic regulation of temperature it is a common practice to determine the value of said temperature by means of a sensitive resistance bulb forming one arm of a bridge network energized from an alternating-current supply, and to utilize the unbalance current in said network, amplified to a suitable degree, for operating a servomotor whereby the network is adjusted to rebalance the bridge. The displacement of the balancing element provides a measure of the temperature value, and is also used to actuate elements of a control couple to adjust a temperature-affecting agent, whereby there is obtained a temperature regulatory influence. So long as all elements of the system coact in a normal manner any tendency of the temperature to rise above the pre-established control point will be offset by a proportionate withdrawal of heating influence (or increase of cooling influence) with a consequent substantial maintenance of the desired value. In case of accident to the control equipment or failure of the amplifying unit, it is quite possible that the heating influence may be maintained at an undesirably high value or may even be increased, with resultant damage to plant and hazard to personnel.

In recognition of these hazards it has heretofore been proposed to provide in certain control systems some means of "artificially" biasing a primary regulating instrument, or of fitting accessory devices whereby an abnormal excursion of an indicating pointer will initiate action of accessory devices tending to eliminate the source of hazard. Such expedients are subject to two outstanding weaknesses, one being that, as they are associated with the measuring instrument, they do not inherently protect against failure of that instrument or of relay devices interposed between said instrument and the regulating device, and the other being that they generally require the addition of certain mechanisms not only in themselves subject to defects, but likely to stand with such defects undetected so long as the control system operates in a normal manner, and to fail to perform their normal and only function under those conditions where such protection is essential.

It is an object of the present invention to provide means whereby in a servo-motor actuated measuring and control system, failure of essential elements of the system to carry out their normal function will cause to be superposed on the normal performance of the apparatus a control influence tending to adjust the controlled magnitude to a non-hazardous condition.

It is a further object to provide means whereby the above object may be effected without structural changes in the apparatus and without the addition of moving parts to the system.

In carrying out the purposes of the invention, it is proposed to provide, in combination with a servomotor, means for continuously biasing the action of the same in a sense corresponding to an approach of the controlled magnitude toward the undesired excess condition, said biasing influence being insufficient to interfere with performance of the control system under normal operating conditions, but enough to drive the motor and elements actuated thereby always toward one end of the operating range. The biasing action of the servomotor being selected to correspond to the undesired excess, it follows that the control of temperature or other magnitude will be affected as though such excess existed, with a resultant departure of the magnitude from the hazardous condition. Specifically, it is proposed to provide an alternating-current servomotor with auxiliary means in its electrical system, whereby, so long as the motor receives energization from an A.-C. supply, there will exist a slight bias of torque, tending to operate said motor in a sense to move the control members actuated thereby to a "safe" position.

In the drawings:

Fig. 1 is a diagrammatic representation of a manner in which the principle of the invention may be applied to the regulation of temperature as determined by the resistance thermometer principle.

Fig. 2 is a diagram of a conventional thermocouple pyrometer system to which the principle of the invention may be applied.

Figs. 3, 4, 5 and 6 illustrate alternative forms which may be assumed by an essential element of the invention.

Referring now to the drawings:

In Fig. 1, the numeral 10 designates a base or mounting plate upon which are carried the several elements of a control device adapted to the purposes of the invention. The invention is shown in its application to control of temperature in an oven or equivalent enclosed space 11, said temperature being maintained by fluid fuel or other heating medium admitted to said oven from a source 12 through a pipe or conduit 13 having therein a control valve 14 subject to actuation by a reversible electric motor 15.

Determination of temperature within the oven 11 is effected by a sensitive resistance bulb 16 forming one arm of a bridge network 17, the mechanical elements of which may be physically mounted upon the base plate 10. The bridge network 17 includes a fixed reference arm 18 having a resistance value preferably of the same order of magnitude as the nominal value of the bulb 16, together with ratio arms 19 and 20, and an extended slide-wire 21 connected between said ratio arms and comparatively engaged by a sliding contact 22 adapted to be translated by means of a lead screw 23, to various positions along the extended length of said slide wire 21. The several elements of the bridge are connected in a conventional manner, as shown, and the network is energized at two opposite terminals, preferably through an isolating transformer 24 of suitable ratio, from an alternating-current source 25. By proper selection, proportioning, and adjustment of the several arms of the bridge circuit, a condition can be obtained in which for any value of the resistance 16 within the range of measurement, the sliding contact 22 can be located in a position to balance the bridge and reduce to zero the alternating potential between said sliding contact and the opposite free terminal of the bridge. The sliding contact 22 may, if desired, have associated therewith an index or pointer 22', which, in cooperation with a fixed graduated scale 23' will provide an indication of the position assumed by said sliding contact, and hence of the temperature to which the resistance bulb 16 is exposed.

The sliding contact 22 and the opposite terminal of the bridge 17 are connected to the input terminals of an amplifier unit 26, which may be of any conventional type wherein an alternating potential impressed between said terminals will be amplified to a voltage corresponding in magnitude and phase position to said potential and having sufficient power to be utilized for control purposes. As shown in Fig. 1, the amplifier 26 comprises a triode 27 having a cathode, an anode, and a control electrode. The cathode and the control electrode are connected to the input terminals of the amplifier. Between the anode and the cathode is connected a battery or other suitable source of unidirectional electric energy 28, in series with the primary winding of a transformer 29 whose secondary winding is connected to the output terminals of the amplifier.

Mounted upon the base-plate 10 is an alternating-current motor 30 comprising a laminated ferromagnetic stator member having four polar projections 31, 32, 33, and 34, numbered in order about a cylindrical airgap wherein is rotatably mounted a squirrel-cage rotor 35. The poles 31—32 have a common yoke 36; and the poles 33—34 have a common yoke 37, said yokes 36—37 in turn forming extremities of a core member 38 upon which is wound an exciting coil 39 adapted to be continuously energized from the alternating-current source 25. As thus far described, the poles 31 and 32 may be looked upon as legs of one common bifurcated pole, and the poles 33 and 34 as legs of another common bifurcated pole of the core member 38; and, as such, the flux due to excitation of said core by the winding 39 would divide into two parallel paths and would act upon the rotor 35 substantially as a bi-polar single-phase magnetic field, with no consequent tendency toward rotation of said rotor.

Wound upon the polar projections 31, 32, 33, and 34 respectively, are substantially identical coils 41, 42, 43, 44; and, to form a continuous winding, said coils are interconnected in the following manner: Starting from one end of the coil 42 a conductor 45 leads to one end of coil 44. Thence, a conductor 46 leads to one end of coil 41, and thence a conductor 47 to one end of coil 43. The relative polarities of the several coils are made such that a current passing through them will at the same time impart "north" polarity to the poles 32 and 33, and "south" polarity to the poles 31 and 34, these polarities all reversing, of course, with reversal of current in the interconnected windings. The free terminals of the coils 42 and 43 are connected to the output terminals of the amplifier 26, which are the secondary terminals of the transformer 29 forming a part of said amplifier.

While no novelty is claimed for the combination hereinabove set forth, its operation may be briefly described. Assuming, first, a balanced condition in the bridge network 17, with the contact 22 resting in a position corresponding to the temperature of the bulb 16, there will be no alternating potential between the conductors connected to the input terminals of the amplifier 26, and hence no alternating component to the output current from the triode 27. Therefore, there will be no voltage developed in the transformer 29, and hence, no tendency for current therefrom to circulate in the winding made up of the four coils on the polar projections of the motor 38. Accordingly, as hereinbefore set forth, the flux due to excitation of the motor magnetic system by the winding 39 will have no out-of-phase component, and the rotor 35 will remain at rest.

It may now be assumed that a condition of unbalance has developed in the bridge 17 due to a change in temperature of the bulb 16. The resulting alternating unbalance potential, depending in intensity and in phase position upon the sense of unbalance, will be impressed upon the input terminals of the amplifier 26, and therefrom between the cathode and control grid of the triode 27, and will cause to flow in the output circuit of said tube an alternating current having phase and intensity conditions dependent upon those of the applied potential, and therefore upon the sense and magnitude of bridge unbalance. The alternating component of the output current of the triode 27 will cause the transformer 29 to develop a corresponding voltage which will be impressed upon the terminals of the polar-projection circuit of the motor 38, producing a cross-flux which will combine with the main flux due to exciting current in the winding 29. Should the interconnected elements of the circuits lack those features necessary to produce a suitable phase displacement between said main and the cross fluxes, the desired phase shift may be introduced by any one of a number of well-known expedients, and, for example, may be obtained by incorporating in the transformer 24 such phase characteristics as will cause the interacting fluxes to produce a rotating field in the air gap of the motor, and develop a rotative effort upon the rotor 35. As the phase position of the potential deevloped in the bridge network 17 will depend upon the sense of unbalance, it follows that the amplified potential applied to the pole windings of the motor will be similarly varied, whence the direction of rotation of the latter will also depend upon the sense of bridge unbalance.

The rotor 35 is mechanically connected to the lead screw 23 by means of a worm gearing 49 and a shaft 50, whereby said lead screw will be actuated to translate the contact 22 along the slide wire 21 in a direction depending upon that of said rotor; and by proper selection of relative directions, the translation of said contact may be made always such as to tend to restore any unbalance condition developed in the bridge network. The apparatus as thus far described constitutes a servomotor-actuated measuring system, embodying a bridge type of resistance thermometer, wherein the sliding contact 22 will tend to assume a translated position corresponding to the temperature of the bulb 16.

Movable with the sliding contact 22 is a contact element 51 adapted to engage alternatively either of two contact members 52 and 53, according to the displacement of contact 22. The contacts 52 and 53, though not so shown in the drawing, preferably constitute an assembly which may be adjusted in a sense parallel to the excursion of the sliding contact 22 whereby to vary the point in its travel where contact 51 will engage one or other of the contacts 52—53. The contacts 52—53 and the contact 51 are connected in a conventional manner, as shown, to the valve motor 15 and to a source of electric power 55, whereby said motor will be caused to operate in a direction depending upon which of said contacts 52—53 is engaged by the movable contact 51. Circuit connections are made such that movement of contact 51 in response to an increase in temperature of the bulb 16 will cause the motor 15 to be energized in a sense to close the valve 14 and reduce the rate of application of heating medium to the interior of the oven 11. Conversely, a lowering of temperature at the bulb 16 would result in the motor 15 being energized in a sense to open the valve 14 and increase the rate of heat application. The apparatus as thus far described constitutes a conventional servomotor-actuated temperature regulating instrument, utilizing the principle of the bridge-type resistance thermometer; and for this combination no invention is herein claimed.

It is a recognized fact that there are inseparable from a control installation of the nature hereinabove set forth certain weak points more likely than other elements of the system to be subject to failure in service. These are (1) the temperature-sensitive element, which is more or less directly exposed to conditions within the space to be heated, and (2) the amplifying system, containing electron tubes, and other comparatively delicate parts. In the installation described these elements would be represented respectively by the bulb 16 and the amplifier 26. In the event of an open circuit in the bulb 16, the bridge network will react as though there had been an abnormal rise in temperature, and the control mechanism will function in a manner to reduce the rate of application of heat, which action is in the "safe" direction. Hence no special auxiliary device, is required to protect against failure of the resistance bulb. Failure of the amplifier 26, on the other hand, will result in there being no voltage between its output terminals, in which case the motor pole windings will be deprived of excitation, and the rotor 35 will normally remain at rest without respect to further changes in temperature which may take place. In the event of such a condition developing, heat will continue to be applied to the interior of the oven 11, regardless of temperature changes therein; and, if this supply of heat is greater than can be dissipated by said oven, the temperature will continue to rise, and may attain a hazardous value.

Protection against such conditions—and it is to this feature that the present invention is primarily directed—is provided by establishing means whereby the motor is permanently biased in a sense that, while normal operation in either direction is not appreciably inhibited, removal of such externally developed potential as is normally impressed upon the operating windings carried by the polar projection will allow said bias to assert itself, and cause the motor to be run to that position in which the controlling instrumentalities tend to eliminate hazardous conditions.

One form in which the desired biasing influence may be applied to the motor is shown in Fig. 1. Between the conductor 46, which forms the midpoint of the interconnected polar-winding system, and one of the two conductors which connect this system to the output terminals of the amplifier 26 is connected a suitable impedance 60, which may take the form of a resistor, an inductance, or a capacitance, thus providing a load or partial short-circuit across two opposed coils of said winding system. The characteristics and magnitude of the impedance 60 are made such that the electromotive force induced in the loaded portions of the winding by virtue of the portion of the main alternating field linked therewith will cause to flow therein currents, which, coacting with the main flux, will set up a rotating field of sufficient intensity to develop on the rotor 35 a continuous torque in one direction. The direction of bias will depend not only upon which pair of opposed polar windings is included in the short-circuited loop, but upon the nature of the total impedance of the loop; and this direction will, of course, be selected so that the motor is biased toward a "safe" condition. As shown in Fig. 1, connection of the impedance between conductor 46 and the upper terminal of the amplifier provides a loading circuit across the windings on the poles 32 and 34, while, if the impedance be connected between the conductor 46 and the lower terminal of the amplifier, the loading influence will be impressed upon the windings of the poles 31 and 33; and, with similar impedance in the loop circuit, the motor will be biased in the opposite direction.

In Fig. 2 is shown a diagrammatic representation of a form of temperature measuring circuit including a thermocouple and a potentiometer, adapted to the automatic regulation of said temperature, and to whose "fail-safe" operation the principles of the invention may be applied. A potentiometer 64 comprises a slide-wire resistor 65 having in electrical engagement therewith a slidable contact 66 adapted to be translated along said slide wire by means of a lead screw 67. The slide wire 65 is energized from a battery 68 or equivalent source of direct current, through an adjustable resistor 69, whereby the current in said slide wire may be adjusted to, and maintained at, a predetermined constant value. A pointer or index 70, movable with the contact 66, cooperating with a juxtaposed graduated scale 71, provides a measure of the translated position of said contact; and a contact system 72 in all respects the equivalent of the combination of contacts 51, 52, and 53 in Fig. 1 enables control of an electrically actuated valve to be effected in correspondence with the translated position of the contact 66.

A thermocouple 75 exposed to the temperature under control has one of its terminals connected to one end of the slide wire 65, and the other terminal, through a detector device 76 to the movable contact 66. The apparatus shown in Fig. 2 as thus far described constitutes a conventional potentiometric pyrometer; and by adjusting the position of the contact 66 with respect to the slide wire 65 until the detector 76 indicates a zero potential at its terminals, the translated position of the index or pointer 70 in relation to the scale 71 may be made a measure of the temperature to which the thermocouple 75 is exposed.

The detector 76 may be on any one of a number of types commonly known as the "inverter" class, in which unidirectional electromotive force of small magnitude is caused to control the phase position and amplitude of an alternating electromotive force having a frequency determined by that of a suitable alternating supply source. A preferred form of such inverter is that fully set forth and described in the copending application Serial No. 521,236, filed February 5, 1944, now Patent No. 2,444,726, issued July 6, 1948, by W. H. Bussey. In the simplified form of such device shown in Fig. 2, a ferromagnetic core 77 is provided with three legs each having a winding thereon. The windings on the outer legs are interconnected and their free terminals are connected to the primary winding of a transformer 78. The contact 66 and the free terminal of the thermocouple 75 are also connected to the terminals of said transformer in parallel with the windings on the legs of the core 77. The winding on the middle leg of the core is energized through a transformer 79 from a suitable alternating-current source 80. The secondary winding of the transformer 78 is connected to the input terminals of an amplifier 81, which may be similar to the amplifier 26 shown in Fig. 1; whereupon the output terminals of said amplifier 81 may be utilized as a source of control energy for an alternating-current motor not shown in the drawing, but in all respects identical with the motor 38 shown in Fig. 1, having one winding continuously energized from the source 80, and adapted to drive the lead screw 67 for the purpose of establishing and maintaining a condition of balance in the potentiometer 64. The operating principle of the detector 76, as fully set forth in said Bussey application, is such that upon a unidirectional electromotive force representative of a condition of unbalance being applied to the terminals of the winding on the outside legs of the core 77, the non-linear characteristics of the ferromagnetic material of said core will cause to be developed in said winding, and applied to the primary terminals of the transformer 78, an alternating electromotive force of intensity corresponding to the magnitude of said unbalance potential, of a frequency corresponding to that of the source 80, and having with respect thereto a phase position dependent upon the polarity of said unidirectional electromotive force. By suitably selecting relative polarities of windings and interconnections, the transformer 78 may be caused to develop an output voltage which when passed through said amplifier 81, and applied to a balancing motor, will operate said motor in a sense to reduce to zero the unbalance voltage in the potentiometer 64, thereby providing by the position of the pointer 70 a measure of the thermocouple temperature, and by actuation of the contact system 72, a regulation of said temperature. It will be understood that Fig. 2 does not show the invention, but only a form of measuring and control system to which the invention in any of its disclosed forms may be applied in a manner identical to that shown in Fig. 1.

In the form of the invention shown in Fig. 3, the motor 38 differs from the form in which it is shown in Fig. 1 only by a change in the structure of the pole-tip windings. The coils 41 and 43 on polar projections 31 and 33 are identical with those hereinbefore set forth; but the polar projections 32 and 34 are provided with coils 85 and 86 each having a materially greater number of turns than the coils 41—43. The four coils are shown as being interconnected in a manner identical to those in Fig. 1. The motor as indicated in Fig. 1 is directly connected to the terminals of the secondary winding of the transformer 29 in the amplifier 26; and the impedance 30 shown in Fig. 1 is omitted. When the exciting winding 39 of the motor 38 is energized from an alternating-current source, the alternating magnetic flux passing through the several polar projections and linking with the windings thereon will induce in the latter electromotive forces tending to set up an alternating current in the interconnected windings. The secondary winding of the transformer 29 will provide a complete circuit for such current, and the reactance of said winding, in conjunction with that of the pole-tip windings will introduce a phase-shift tending to displace said current from the main flux and introduce a quadrature component in the magnetic field produced by said current. Because of the lack of symmetry introduced by the opposite coils 85 and 86 having a greater number of turns than the coils 41—43, the cross field produced in the polar projections 32—34 will be greater than that in the poles 31—33, with a corresponding tendency to impart a torque to the rotor 35, and bias the same for rotation always in the same direction when no electromotive force is being applied to the primary of the transformer 29. Thus, should the triode 27 (shown in Fig. 1) fail, or the amplifier otherwise become inoperative, the motor 38 will act under the influence of the permanently applied bias, and will move the controlling elements to a safe position. While, for purposes of consistency, the four coils on the pole tips of the motor 38 in Fig. 3 are shown as being interconnected in a manner identical to those in Fig. 1, they may in the present instance be connected in any manner which will preserve the hereinbefore stated relative polarity. The distinction between connection requirements for the motor as shown in Fig. 3 and as shown in Fig. 1 lies in the requirement of the latter that there be available a mid-tap whereby the winding could be divided into two groups of coils each embracing diagonally opposed polar projections. The simplified interconnection of these coils may be in accordance with the arrangement shown in Fig. 4, which form of the invention will now be taken under discussion.

In the form of the invention shown in Fig. 4, the circuit in which induced currents are caused to flow for the purpose of biasing the motor, is kept separate from the operating winding, and takes the form of two small auxiliary coils wound upon diagonally opposed polar projections of the magnetic structure. The poles 31, 32, 33 and 34 may carry the same coils 41, 42, 43 and 44 as shown in Fig. 1. As previously explained, the interconnection of these coils may be simplified from the arrangement indicated in Fig. 1, and they are shown in Fig. 4 as having a simple series arrangement, the coils being connected in order of their numbering, and given such relative polarity as will produce a proper sequence of poles about the air gap when they are energized from an external source.

Wound upon the tips of the opposed polar projections 32 and 34 are small auxiliary coils 90 and 91; and these are directly connected to suitable impedances 92 and 93 respectively, the relative proportions of said coils and impedances being so selected that the short circuit currents flowing therein due to excitation of the magnetic structure by alternating current flowing in the winding 39, will produce a cross-field which, combining with the main field, will set up the rotary component necessary to apply a suitable bias upon the rotor 35. In some instances, it will be possible by suitably designing the auxiliary windings 90 and 91 to incorporate the required reactive impedance therein, thus eliminating the external impedances 92 and 93, whereupon each of said auxiliary windings becomes in effect a shading coil of more or less conventional type.

The form of the invention shown in Fig. 5 from which drawing, in the interests of clarity, the operating pole-windings have been omitted, differs from that in Fig. 4 only to the extent of the auxiliary coils 90 and 91 being interconnected (with due consideration for relative polarity) and loaded by a common impedance 95. In performance, this form of the invention would not materially differ from that shown in Fig. 4, but, since the external impedance 95 is common to both auxiliary pole-tip windings, it is possible to effect simultaneous adjustment of their joint influence without risk of sacrificing their symmetry of action.

The form of the invention illustrated in Fig. 6 is very similar to that shown in Fig. 1, the only distinction therefrom lying in the separation of the means for loading two of the four polar windings into two distinct units. As shown in Fig. 1, the said windings are interconnected in such a manner that the impedance 60, connected from the mid-point of the winding to one of the terminals of the amplifier, bridges two opposed polar windings, causing eddy currents to flow therein and produce the desired biasing effect. In the form shown in Fig. 6, the two windings 42 and 44 are independently loaded by impedance units 97 and 98 bridged across their respective terminals and adjustable to produce a biased torque similar to that resultant upon the presence of the impedance unit 60 in Fig. 1. While separation of the loading element into two units requires independent adjustment thereof in manufacture, it simplifies the interconnection of the polar windings, in that, as in the form of the invention shown in Fig. 4, it is necessary only that the several windings be connected with the correct relative polarity, and without regard to their sequence in the circuit.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a control apparatus, an alternating current electric motor comprising a main field structure with divided poles and a winding on said structure adapted for energization from an alternating-current source to produce a main flux in said structure, means responsive to a control condition and independent of said motor for producing an alternating current corresponding in intensity and phase position to deviation of said condition in one direction or the other from a predetermined magnitude, said divided poles having thereon windings for developing a cross flux between said poles in response to flow of the last-mentioned alternating current to effect reversible operation of said motor according to the phase of said current and for carrying currents induced by the action of said main flux when no alternating current is produced by said condition-responsive means, and means for rendering the flux due to said induced currents asymmetrical in space with respect to said main flux whereby to develop a magnetic field having a rotary component and thereby bias said motor for operation in a predetermined direction.

2. A control apparatus as defined by claim 1, wherein the currents induced by said main flux flow through the same windings that receive alternating current produced by said condition-responsive means, and wherein the means for rendering the flux due to said induced currents asymmetrical to the main flux comprises the provision of a different impedance to current flow through a portion of said windings than through another portion thereof.

3. A control apparatus as defined by claim 1, wherein the currents induced by said main flux flow through the same windings that receive alternating current produced by said condition-responsive means, and wherein the means for rendering the flux due to said induced currents asymmetrical to the main flux comprises impedance means bridging alternate ones of said windings.

4. A control apparatus as defined by claim 1, wherein the currents induced by said main flux flow through the same windings that receive alternating current produced by said condition-responsive means, and wherein the means for rendering the flux due to said induced currents asymmetrical to the main flux comprises the provision of asymmetrical characteristics in certain of said windings.

5. A control apparatus as defined by claim 1, wherein the currents induced by said main flux flow through the same windings that receive alternating current produced by said condition-responsive means, and wherein the means for rendering the flux due to said induced currents asymmetrical to the main flux comprises the provision of a greater number of turns in certain of said windings than in others thereof.

6. A control apparatus as defined by claim 1, wherein one set of windings is provided for receiving the alternating current produced by said condition-responsive means and another set of windings is provided for receiving currents induced by said main flux.

7. A control apparatus as defined by claim 1, wherein one set of windings is provided for receiving the alternating current produced by said condition-responsive means and another set of windings is provided for receiving currents induced by said main flux, the last mentioned windings being provided on alternate ones of said divided poles.

8. A control apparatus as defined by claim 1, wherein one set of windings is provided for receiving the alternating current produced by said condition-responsive means and another set of windings is provided for receiving currents induced by said main flux, and said means for rendering the flux due to said induced currents asymmetrical with respect to said main flux comprises impedance means connected to the last mentioned set of windings.

9. In a control apparatus means responsive to a control condition for producing an alternating current corresponding in intensity and phase position to deviation of said condition from a predetermined magnitude, an alternating current electric motor having a winding adapted to carry said current whereby to operate said motor under control of said current in one direction or the other depending upon the phase of said current, said motor having a further winding providing an alternating flux derived from current from another alternating current source, and electrical means deriving its energy solely from the normal exciting flux of said motor for causing operation of said motor in one of said directions upon cessation of flow of the first mentioned alternating current.

10. In a control apparatus of the class having a control member adapted to be positioned by an alternating-current electric motor having a main field structure with divided poles and means for providing continuous excitation of said structure from a principal alternating-current source to produce alternating magnetic flux therein, said motor also having an electric circuit magnetically linked with said poles to be energized with alternating current from a source external to said motor but of the same frequency as said principal source for reversible operation of said motor according to the phase of said current, electric circuit means adapted to carry currents induced by said alternating flux in said divided field structure and independent of said external source, and means for rendering the flux due to said last-named currents asymmetrical in space with respect to that produced by said excitation, whereby to develop a magnetic field having a rotary component and thus bias said motor for rotation in a predetermined direction.

11. In a control apparatus of the class having a control member adapted to be positioned by an alternating-current electric motor having a main field structure with divided poles and means for providing continuous excitation of said structure from a principal alternating-current source to produce alternating magnetic flux therein, said motor also having on said poles and magnetically linked therewith individual windings, interconnected and adapted to be energized with alternating current from a source external to said motor but of the same frequency as said principal source for reversible operation of said motor according to the phase of said current, impedance means bridging alternate ones of said interconnected windings to permit the flow in the same of eddy currents induced by said alternating flux in said divided field structure and independent of said external source, whereby to develop in conjunction with said flux a field having a rotary component and thus bias said motor for rotation in a predetermined direction.

12. In a control apparatus of the class having a control member adapted to be positioned by an alternating-current electric motor having a main field structure with divided poles and means for providing continuous excitation of said structure from a principal alternating-current source to produce alternating magnetic flux therein, said motor also having on said poles and magnetically linked therewith individual windings, interconnected and adapted to be energized with alternating current from a source external to said motor but of the same frequency as said principal source for reversible operation of said motor according to the phase of said current, said individual windings having asymmetrical characteristics whereby electromotive forces induced in certain ones of the same by said alternating flux will be imperfectly balanced by electromotive forces similarly induced in others of the same, with a resultant component tending to cause to flow through said windings and said external source and independently of the voltage of said source an out-of-phase current whereby to develop in conjunction with said flux a field having a rotary component and thus bias said motor for rotation in a predetermined direction.

13. In a control apparatus of the class having a control member adapted to be positioned by an alternating-current electric motor having a main field structure with divided poles and means for providing continuous excitation of said structure from a principal alternating-current source to produce alternating magnetic flux therein, said motor also having on said poles and magnetically linked therewith individual windings, interconnected and adapted to be energized with alternating current from a source external to said motor but of the same frequency as said principal source for reversible operation of said motor according to the phase of said current, auxiliary coils wound upon alternate ones of said poles and having closed circuits excluding any external source of electromotive force, and adapted to have circulating therein eddy currents induced by said alternating flux in said divided field structure and independent of said external source, whereby to develop in conjunction with said flux a field having a rotary component and thus bias said motor for rotation in a predetermined direction.

14. In a control apparatus, an alternating current electric motor having a main field structure with divided poles and means for providing continuous excitation of said structure from a principal alternating-current source to produce alternating magnetic flux therein, means responsive to a control condition for producing an alternating current of the same frequency as said principal source and corresponding in intensity and phase position to deviation of said condition in one direction or the other form a predetermined magnitude, said motor also having on said poles windings adapted to be energized with alternating current from the second mentioned source to develop a flux for effecting reversible operation of said motor according to the phase of said current, and means associated with said windings for biasing said motor for rotation in a predetermined direction through energy derived from said main flux.

15. A control apparatus as defined by claim 14, wherein the last mentioned means comprises provisions for imparting a different impedance to certain of said windings than to others thereof.

16. A control apparatus as defined by claim 14, wherein the last mentioned means comprises a greater number of turns in certain of said windings than in others thereof.

17. A control apparatus as defined by claim 14, wherein the last mentioned means comprises impedance means connected across certain of said windings.

18. A control apparatus as defined by claim 14, wherein the last mentioned means comprises additional windings separate from those previously mentioned, said additional windings being positioned on certain of said poles in the path of said main flux.

19. In combination, an electrical network, means responsive to the magnitude of a condition, means connecting said responsive means to said network for unbalancing the same in one direction or the other in response to deviations of said condition in one direction or the other from a predetermined magnitude, means responsive to unbalance of said network for producing an alternating current of intensity corresponding to the extent of unbalance and of phase position corresponding to the direction of unbalance, an alternating-current electric motor having a field structure and a winding thereon adapted for energization from another source of alternating current to produce a main flux in said structure, connections between said motor and said means responsive to unbalance of said network for producing a flux for reaction with said main flux to effect operation of said motor in one direction or the other depending upon the phase position of the first mentioned alternating current, said motor including winding means in inductive relation to said main flux for developing a flux biasing said motor for rotation in a predetermined direction.

20. In combination, an electrical network, means responsive to the magnitude of a condition, means connecting said responsive means to said network for unbalancing the same in one direction or the other in response to deviations of said condition in one direction or the other from a predetermined magnitude, means responsive to unbalance of said network for producing an alternating current of intensity corresponding to the extent of unbalance and of phase position corresponding to the direction of unbalance, an alternating-current electric motor having a field structure and a winding thereon adapted for energization from another source of alternating current to produce a main flux in said structure, connections between said motor and said means responsive to unbalance of said network for producing a flux for reaction with said main flux to effect operation of said motor in one direction or the other depending upon the phase position of the first mentioned alternating current, said motor including winding means in inductive relation to said main flux for developing a flux biasing said motor for rotation in a predetermined direction, and means actuated by said motor for restoring the balance of said network.

21. In combination, an electrical network, means responsive to the magnitude of a condition, means connecting said responsive means to said network for unbalancing the same in one direction or the other in response to deviations of said condition in one direction or the other from a predetermined magnitude, means responsive to unbalance of said network for producing an alternating current of intensity corresponding to the extent of unbalance and of phase position corresponding to the direction of unbalance, an alternating-current electric motor having a field structure and a winding thereon adapted for energization from another source of alternating current to produce a main flux in said structure, connections between said motor and said means responsive to unbalance of said network for producing a flux for reaction with said main flux to effect operation of said motor in one direction or the other depending upon the phase position of the first mentioned alternating current, said motor including winding means in inductive relation to said main flux for developing a flux biasing said motor for rotation in a predetermined direction, and means actuated by said motor for controlling said condition.

22. In combination, an electrical network, means responsive to the magnitude of a condition, means connecting said responsive means to said network for unbalancing the same in one direction or the other in response to deviations of said condition in one direction or the other from a predetermined magnitude, means responsive to unbalance of said network for producing an alternating current of intensity corresponding to the extent of unbalance and of phase position corresponding to the direction of unbalance, an alternating-current electric motor having a field structure and a winding thereon adapted for energization from another source of alternating current to produce a main flux in said structure, connections between said motor and said means responsive to unbalance of said network for producing a flux for reaction with said main flux to effect operation of said motor in one direction or the other depending upon the phase position of the first mentioned alternating current, said motor including winding means in inductive relation to said main flux for developing a flux biasing said motor for rotation in a predetermined direction, and concurrently controlling said condition.

ABRAHAM WALTER JACOBSON.

REFERENCES CITED

The following references are of record in the file of this patent:

UNITED STATES PATENTS

| Number | Name | Date |
| --- | --- | --- |
| 2,112,218 | Gille | Mar. 22, 1938 |
| 2,123,182 | Drake | July 12, 1938 |
| 2,134,685 | Crise et al. | Nov. 1, 1938 |
| 2,270,991 | Bagno | Jan. 27, 1942 |
| 2,333,393 | Ryder | Nov. 2, 1943 |